J. KEISER.
MILLING CUTTER.
APPLICATION FILED JUNE 11, 1918.
1,316,959.
Patented Sept. 23, 1919.
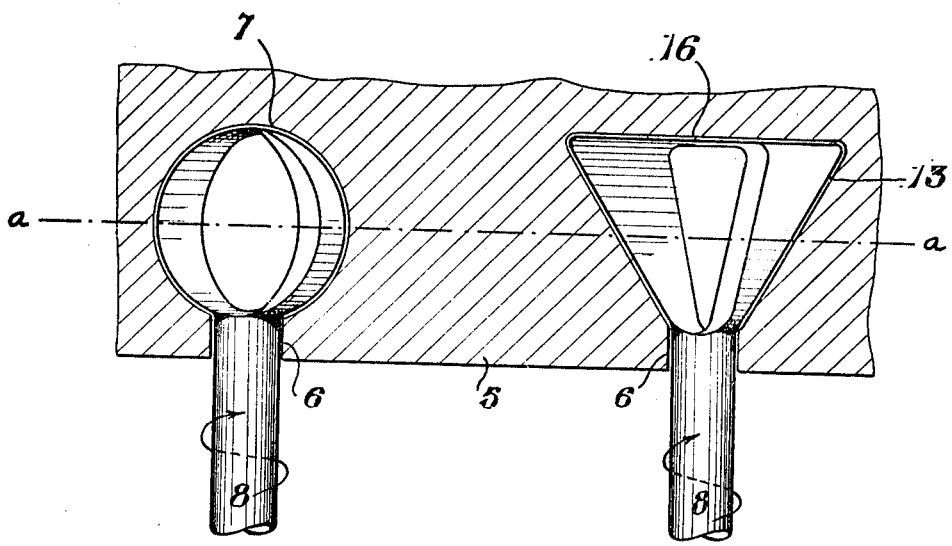
FIG.1.    FIG.2.
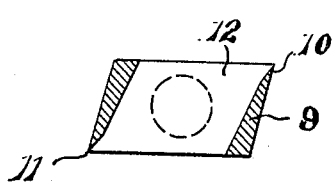    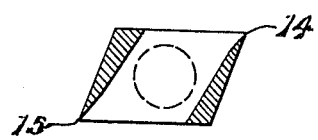
FIG 3    FIG 4
INVENTOR
JAN KEISER
BY *Hnnn and Hnnn*
ATTORNEYS

UNITED STATES PATENT OFFICE.

JAN KEISER, OF THE HAGUE, NETHERLANDS.

MILLING-CUTTER.

1,316,959.  Specification of Letters Patent.  Patented Sept. 23, 1919.

Application filed June 11, 1918. Serial No. 239,397.

*To all whom it may concern:*

Be it known that I, JAN KEISER, manufacturer, a subject of the Queen of the Netherlands, and residing at The Hague, Netherlands, have invented certain new and useful Improvements in Milling-Cutters, of which the following is a specification.

The present invention relates to milling cutters, and particularly to a rotary cutter for forming an undercut at the inner end of a parallel-sided channel. The present tool is particularly intended for working in wood and is especially designed to afford ample clearance for the chips thrown off by the cutter while at the same time affording ample strength for the work in hand.

In the accompanying drawings—

Figures 1 and 2 are side elevations of tools having cutting heads of different shapes; and Figs. 3 and 4 are respectively cross sections therethrough on the lines *a—a* of Figs. 1 and 2.

Referring to the drawings the blank 5, upon which the tool operates, has already formed therein a channel 6 with parallel sides. The undercut or head 7 at the inner end of the channel is formed by the present tool.

In the construction shown in Figs. 1 and 3 the tool comprises a shank 8, here shown as having a diameter only slightly less than the width of the channel 6, and a ring-like head 9 of greater diameter for forming the head 7 of the channel. The cutter head comprises an annulus formed in one with or secured to the shank 8, and having one edge shaped halfway around the annulus from the shank to form a cutting blade 10, and an opposite edge shaped as a blade 11 for the remaining portion of the annulus. The cutting head thus presents two arcuate blades, each of like extent, faced in the same direction of rotation, and extending from the shank to a point halfway around the head annulus. Inasmuch as the shank of the tool is substantially the diameter of the channel 6 in the blank, the blades 10 and 11 are carried to the shank. If the latter were of less diameter than the channel it would be unnecessary to carry the shank ends of the blades farther toward the shank than a point distant from the axis of the tool half the width of the channel 6, since the latter is already formed in the blank before the present tool operates thereon. It is obvious that the central opening 12 of the cutter head leaves ample internal clearance for the chips cut from the blank, while the band which forms the annulus is nevertheless quite strong enough to stand the cutting strain to which it is subjected.

In the construction shown in Figs. 2 and 4 the cutter head is shaped to form a channel head 13 of triangular cross section. In this modification the blades 14 and 15 are straight instead of arcuate and diverge from the shank 7, being united at their outer ends by an interconnecting web 16 integral with the remainder of the cutter head.

I am aware that loop cutters have heretofore been used for cutting dovetails or the like in the face of woodwork, and such cutters are shown in the old patent to Huff 207,743 of 1878; Ritchey 117,332 of 1871, and more recently in Richmond 853,321 of 1907. But in none of these cutters are the blades so designed that they may be used for undercutting a grooved blank in which the shank of the tool must be accommodated in the groove. It has of course been suggested heretofore to undercut a grooved blank—as for instance as shown in the British patent to Settle 24106/04. But, so far as I am aware, the only cutters heretofore used in this type of work have been solid cutters, as shown in the Settle patent, although the loop type of cutters has long been well known. By the present invention I have provided a loop cutter for undercutting grooved blanks, which has the merit of affording the greatest possible strength for a given diameter of shank, while at the same time securing the great practical advantage of affording the greatest possible clearance for the chips. The importance of this is well known to every practical woodworker, but so far as known has not been heretofore accomplished in the class of work for which the tool is adapted, and to which alone my claim of invention is directed.

While the tool is useful for other purposes, it is particularly intended for forming undercut heads for channels in curtain rollers, the head of the channel receiving the head of a ribbed rod or tube by means of which the curtain edge is secured to the roller without the use of nails.

I claim as my invention—

1. A milling cutter for operating on grooved blanks, comprising a shank adapted to pass freely through the groove in the blank and having a cutter head of greater diameter than the groove, and comprising a band having its opposite edges on opposite sides of the axis of the shank formed as cutters faced in the same direction rotarially and approaching the shank to a point spaced approximately half the width of the channel in the blank from the axis of the tool.

2. A milling cutter for operating on grooved blanks, comprising a shank adapted to pass freely through the groove in the blank and having an annular cutter head of greater diameter than the groove, comprising a ring having its opposite edges on opposite sides of the axis of the tool shaped as arcuate blades faced in the same direction rotarially and approaching the shank to a point spaced from the axis of the shank approximately half the width of the channel in the blank.

In testimony whereof I affix my signature in presence of two witnesses.

JAN KEISER.

Witnesses:
I. I. HELSDON REX,
H. C. LEWIS.

Copies of this patent may be obtained for five cents each, by addressing the "Commissioner of Patents, Washington, D. C."